United States Patent [19]

Mattison

[11] Patent Number: 4,581,839
[45] Date of Patent: Apr. 15, 1986

[54] ILLUMINATED FISHING LURE

[76] Inventor: Robert N. Mattison, 5826 McKinley Pl. North, Seattle, Wash. 98103

[21] Appl. No.: 648,458

[22] Filed: Sep. 7, 1984

Related U.S. Application Data

[63] Continuation-in-part of Ser. No. 607,284, May 4, 1984.

[51] Int. Cl.$^4$ .............................................. A01K 85/01
[52] U.S. Cl. .................................. 43/17.6; 43/42.34; 43/43.16
[58] Field of Search ................. 43/17.5, 17.6, 42.33, 43/42.34, 43.16; 362/34

[56] References Cited

U.S. PATENT DOCUMENTS

| 62,042 | 2/1867 | Lee | 43/43.16 |
|---|---|---|---|
| 2,117,206 | 5/1938 | Neff | 43/17.6 |
| 3,568,354 | 3/1971 | Yacko | 43/17.6 |
| 3,576,987 | 5/1971 | Voight et al. | 240/2.25 |
| 3,579,895 | 5/1971 | Orn et al. | 43/42.06 |
| 3,597,362 | 8/1971 | Bollyky et al. | 252/186 |
| 3,680,250 | 8/1972 | Hetrick | 43/545 R |
| 3,861,072 | 1/1975 | Holcombe | 43/17.6 |

FOREIGN PATENT DOCUMENTS

| 2757998A1 | 6/1979 | Fed. Rep. of Germany | 43/17.6 |
|---|---|---|---|
| 2232268 | 1/1975 | France | 43/17.6 |
| 59225 | 4/1938 | Norway | 43/17.6 |
| 2100103 | 12/1982 | United Kingdom | 43/43.16 |

OTHER PUBLICATIONS

"New from Sevenstrand," Preview'85, Circle No. 325 on Reader Service Card, AFTMA Booth 0706, Fishing Tackle Retailer Magazine, Jul. 1984, p. 206.

*Primary Examiner*—Nicholas P. Godici
*Assistant Examiner*—C. McKee
*Attorney, Agent, or Firm*—Seed and Berry

[57] ABSTRACT

Fishing lures which include means for releasably securing chemiluminescent capsules therein. Releasable mountings are sized to receive and snuggly hold the resilient chemiluminescent capsules and enable them to be readily popped out and replaced, despite possible variances in length.

In one group of preferred embodiments, the chemiluminescent capsules are releasably mounted within a reflective plate to illuminate both sides of the plate. In another group of preferred embodiments, the chemiluminescent capsules are mounted in the interior of an opaque lure for easy insertion and removal. Another preferred embodiment enables a chemiluminescent capsule to be readily affixed to a segment of fishing line.

8 Claims, 21 Drawing Figures

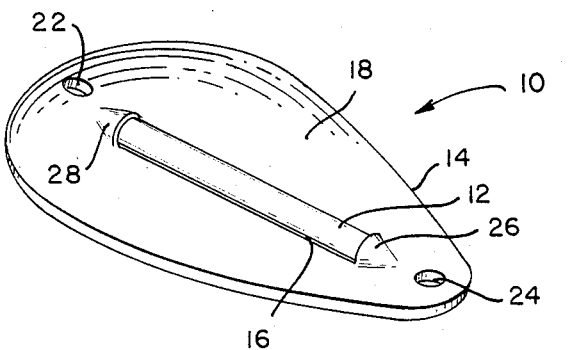
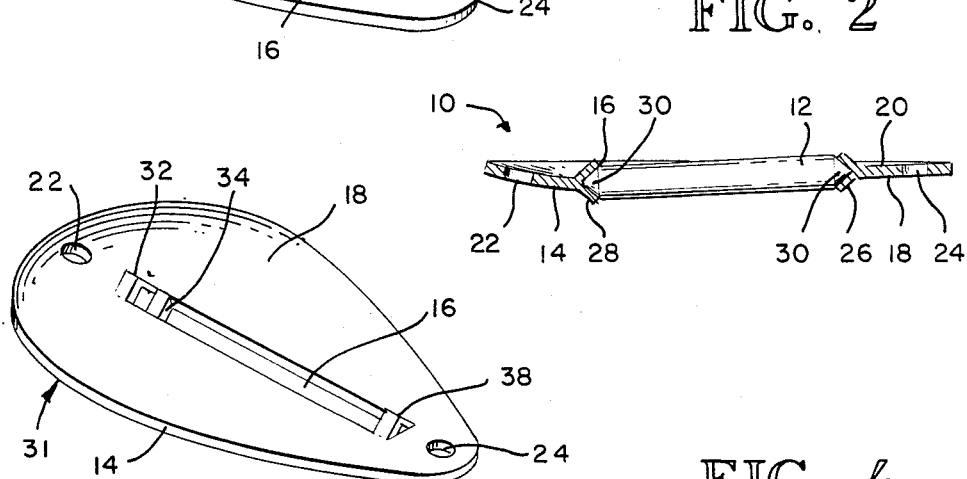
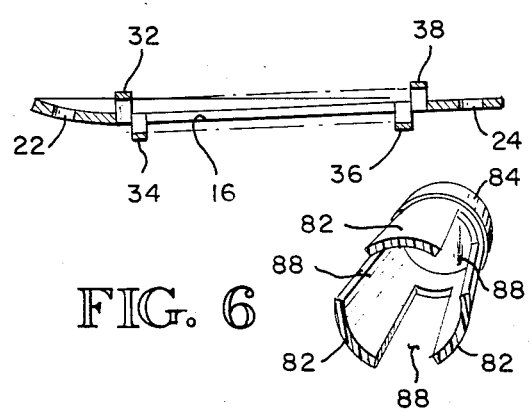
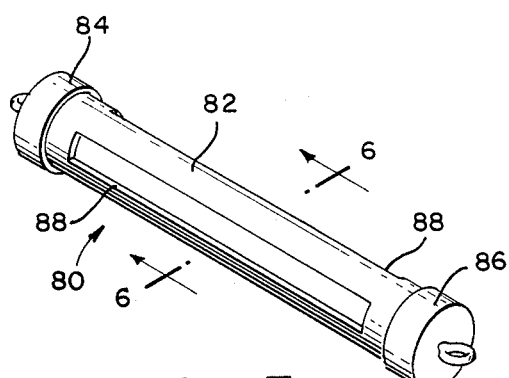
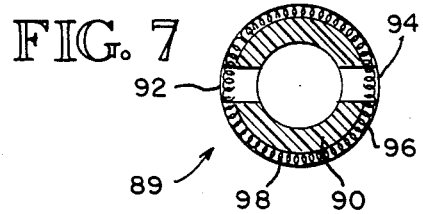
FIG. 1
FIG. 2
FIG. 3
FIG. 4
FIG. 5
FIG. 6
FIG. 7

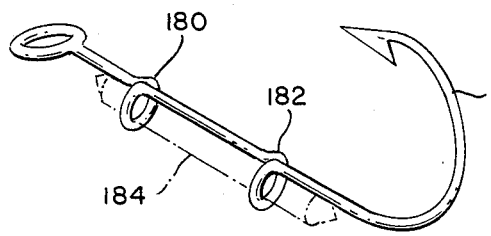
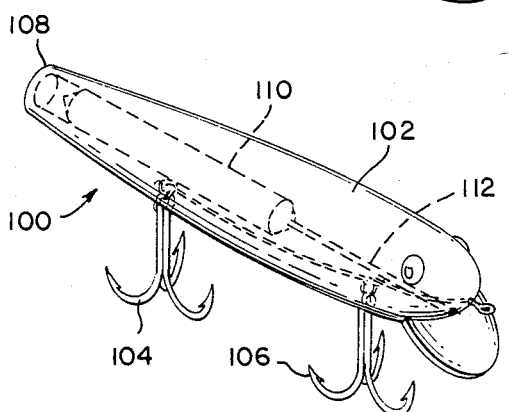
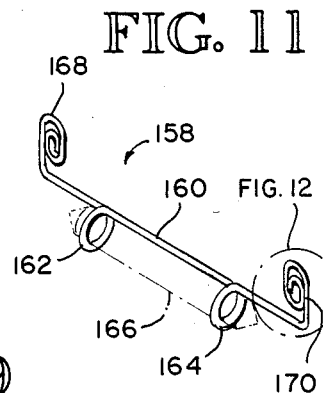
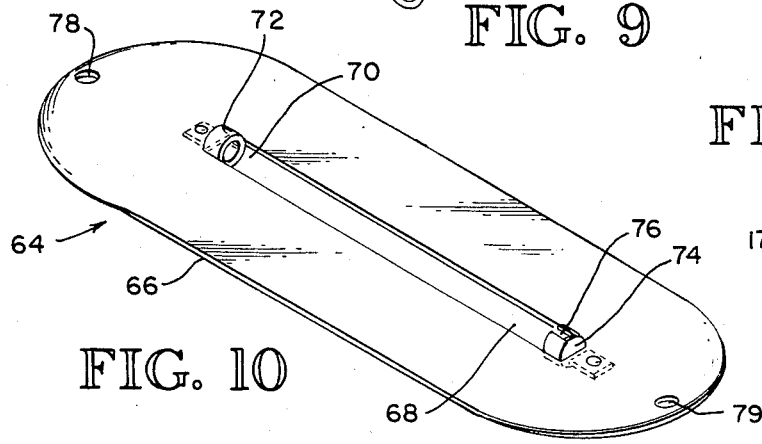
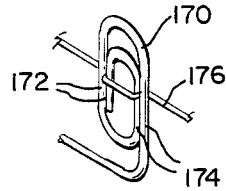
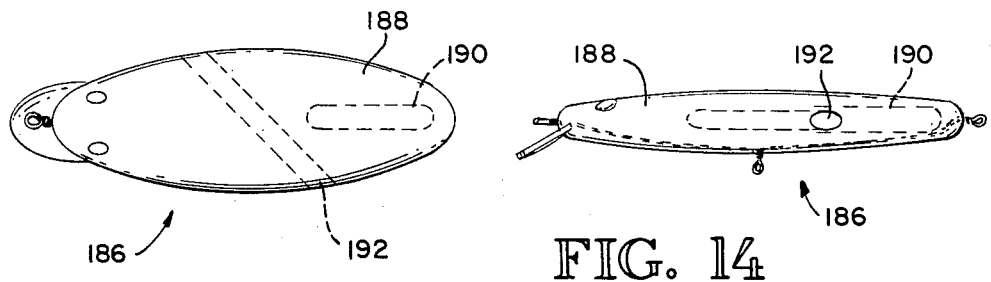

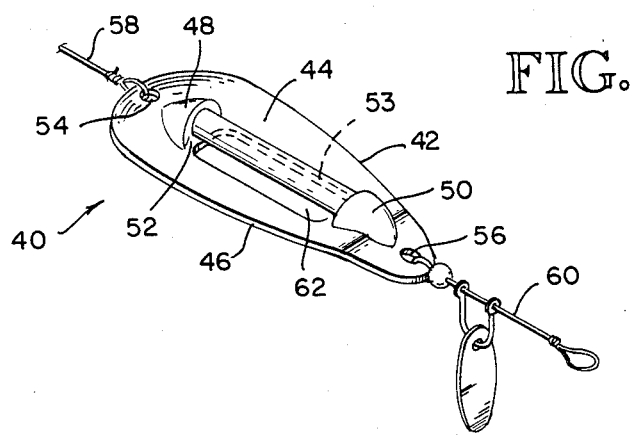
FIG. 15
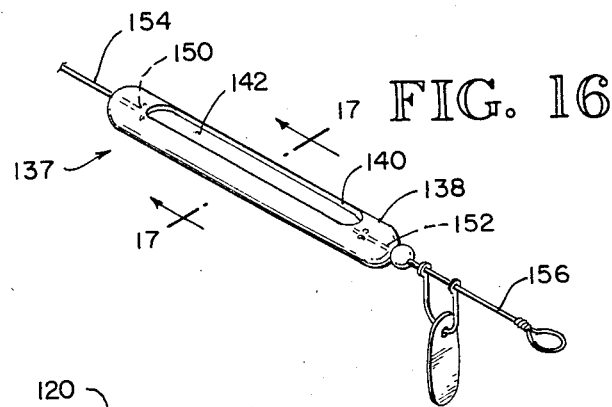
FIG. 16
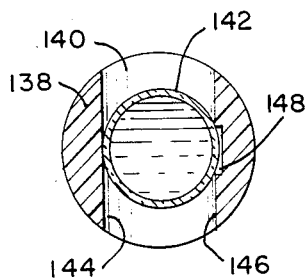
FIG. 17
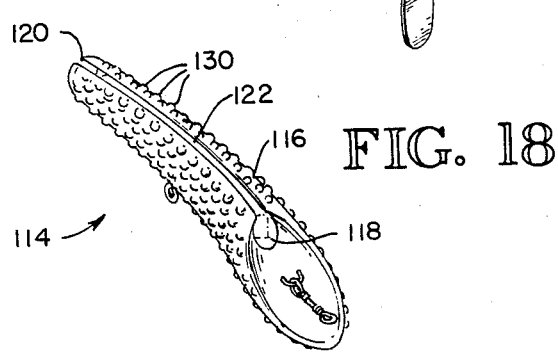
FIG. 18
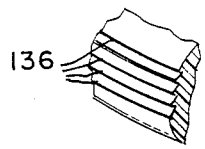
FIG. 21
FIG. 19
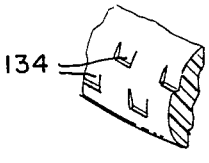
FIG. 20

ILLUMINATED FISHING LURE

DESCRIPTION

Related Applications

This application is a continuation-in-part of prior co-pending application Ser. No. 607,284, filed May 4, 1984 entitled "Fishing Lure and Entrapment Device."

Technical Field

The present invention relates generally to fishing equipment, and more particularly to illuminated fishing lures.

Background Art

In the past, many attempts have been made to improve the ability of fishing lures to attract fish by enhancing the reflective or illuminative properties of the lures. For example, electrically powered lights have been tried in conjunction with fishing lures. Many problems are associated with the use of electrical lights in an underwater environment, however. Water is a conductor and salt water is highly corrosive. Thus, water can cause short circuits and cause metal contacts and other parts to corrode. When the electricity for lights is supplied through power lines, the extension and maintenance of such lines is difficult and particularly impractical for sports fishing. Using a power line when fishing with a reel at any appreciable depth is not feasible. Similarly, the use of a light bulb and battery in a sealed compartment has associated problems. Insufficient illumination, heavy weight, bulky size, leakage of water into the compartment, replacement of batteries, and switching of power to the light bulb are a few of the problems.

As an alternative to electrically powered lights, florescent paint has been used on fishing lures. The amount of illumination provided by such lures, however, is minimal. This is particularly true when fishing on cloudy days or at substantial depths.

Attempts to provide increased illumination have been enhanced by the creation of small chemiluminescent capsules, commonly known as "light sticks." Such capsules typically comprise a sealed glass tube containing a first chemical housed within an outer resilient plastic tube. A second chemical is housed intermediate the tubes. By bending the outer resilient tube, the inner glass tube can be broken to allow the two chemicals to react, causing illumination of the capsule. Chemiluminescent capsules of this type are described in detail in U.S. Pat. No. 3,576,987 to Voight, et al.

Small chemiluminescent capsules are attractive for use with fishing lures because they overcome the problems discussed previously with respect to electrical or florescent systems. To date, however, the use of chemiluminescent capsules has been hampered by lack of an adequate means to readily attach and detach the capsules to a fishing line or fishing lure.

A particular problem presented by existing chemiluminescent capsules is the fact that they are not manufactured with a uniform length. The length of small capsules may vary plus or minus 10%. Such variance has created difficulties in designing fittings for such capsules which, until the present invention, have not been adequately addressed.

It will be appreciated that there has been a need for a convenient and inexpensive illuminating fishing lure which does not require the use of wires, batteries, or light bulbs, and which provides an easily used, self-contained source of light. The present invention fulfills this need and further provides other related advantages.

DISCLOSURE OF THE INVENTION

It is an object of this invention to provide a fishing lure which will house a chemiluminescent capsule and allow such capsule to be readily inserted and removed therefrom.

It is another object of this invention to provide such a fishing lure which will maximize the attractive effect of the chemiluminescent capsule.

It is another object of this invention to provide a means for quickly attaching and detaching chemiluminescent capsules to a fishing line.

It is another object of this invention to provide such fishing lures and attachment means which will work well with capsules of variable length.

These and other objects which will become more apparent as the invention is described more fully below are obtained by providing, in a plurality of embodiments, fishing lures including means for releasably securing chemiluminescent capsules therein. Releasable mountings are sized to receive and snuggly hold the resilient chemiluminescent capsules and enable them to be readily popped out and replaced, despite possible variances in length.

In one group of preferred embodiments, the chemiluminescent capsules are releasably mounted within a reflective plate to illuminate both sides of the plate. In another group of preferred embodiments, the chemiluminescent capsules are mounted in the interior of an opaque lure for easy insertion and removal. Another preferred embodiment enables a chemiluminescent capsule to be readily affixed to a segment of fishing line.

BRIEF DESCRIPTION OF THE DRAWINGS

FIG. 1 is an isometric view of a preferred embodiment of the invention housing a chemiluminescent capsule within a reflective plate.

FIG. 2 is a longitudinal cross-sectional view of the embodiment of FIG. 1.

FIG. 3 is an isometric view of an embodiment for housing a chemiluminescent capsule within a reflective plate having stamped mounting means.

FIG. 4 is a longitudinal cross-sectional view of the embodiment of FIG. 3.

FIG. 5 is an isometric view of an alternate preferred embodiment of the invention.

FIG. 6 is an isometric view of the embodiment of FIG. 5 cut away at line 6—6 in FIG. 5 to illustrate the interior of the fishing lure.

FIG. 7 is a cross-sectional view illustrating a modified version of the embodiment of FIG. 5, including an annular retaining member.

FIG. 8 is an isometric view of an alternative embodiment for mounting a chemiluminescent capsule to a fish hook.

FIG. 9 is an alternative embodiment for housing a chemiluminescent capsule within a translucent fishing lure.

FIG. 10 is an alternative embodiment for housing a chemiluminescent capsule within a reflective plate.

FIG. 11 is an isometric view of an alternative embodiment for enabling a chemiluminescent capsule to be quickly attached and detached from a fishing line.

FIG. 12 is an enlarged view of the line fastener of FIG. 11.

FIG. 13 is a top plan view of an alternate embodiment of a fishing lure according to the invention.

FIG. 14 is a side elevation view of the embodiment of FIG. 13.

FIG. 15 is an isometric view of a preferred embodiment of the invention for housing a chemiluminescent capsule within a concave reflective plate.

FIG. 16 is an isometric view of an alternate preferred embodiment of the invention.

FIG. 17 is a cross-sectional view taken through line 17—17 of FIG. 16.

FIG. 18 is an alternate embodiment for housing a chemiluminescent capsule within a translucent fishing lure.

FIG. 19 is an isometric view of a modified version of the embodiment of FIG. 18.

FIG. 20 is a detail view of an alternative form of surface irregularity for the outer surface of the lures of FIGS. 18 and 19.

FIG. 21 is a detail view of an alternative form of surface irregularity for the outer surface of the lures of FIGS. 18 and 19.

BEST MODE FOR CARRYING OUT THE INVENTION

Fishing lures according to the present invention are designed to allow chemiluminescent capsules to be easily and quickly inserted and removed from the lure, and yet be snuggly held in the lure. Some preferred embodiments of the invention are specially designed to accommodate capsules of variable length. In a first group of embodiments, chemiluminescent capsules are housed within a relatively thin reflective plate such that a capsule projects outwardly beyond each side of the plate. This arrangement allows light to project on each side of the plate, as well as reflect off each side of the plate.

FIGS. 1 and 2 illustrate a fishing lure 10 which comprises a preferred embodiment wherein a chemiluminescent capsule 12 is housed within an elongated reflective plate 14. The chemiluminescent capsule has a generally circular cross-section with a resilient outer casing. As mentioned above, commercially available capsules of this type can vary in length up to ten percent from the nominal length. In the lure of FIGS. 1 and 2, the capsule is mounted in the correspondingly shaped slot 16 in the center of the plate. The width of the slot is substantially equal to the diameter of the capsule, such that the resilient capsule can fit snuggly within the slot and remain in there during use.

As best seen in FIG. 2, the capsule extends outwardly beyond the top face 18 and the bottom face 20 of the plate. The plate is preferably fabricated of reflective material, or fabricated to include a reflective coating on its top and bottom faces. This arrangement allows the capsule to project light outwardly in both directions and allows the light to reflect off the top and bottom faces of the plate, thereby enhancing the luminescent properties of the lure.

The chemiluminescent capsule is held in the slot by two frustraconically shaped fittings 26, 28 placed at each end of the slot. The fittings are sized to receive the tapered ends 30 of the capsule, as seen in FIG. 2. These fittings combined with the specially sized slot to securly hold the capsule despite possible variances in length.

In operation, the fishing lure of FIGS. 1 and 2 is first tied or threaded to a fishing line through the aperture at one end of the plate and a hook is attached to the plate by the aperture at the other end. A chemiluminescent capsule is then activated by bending the capsule to break the inner glass tube. The activated capsule may then be inserted into the slot by placing the ends of the capsule into the respective fittings. When fishing is complete, or the capsule needs replacing, pressure is applied to the center of the capsule to easily pop it out of the slot and fittings.

FIGS. 3 and 4 illustrate a fishing lure 32 of essentially the same design illustrated in FIGS. 1 and 2. Elements corresponding to those illustrated in FIGS. 1 and 2 are given common reference numerals. The fishing lure includes fittings formed by opposed angles 32, 34, 36, 38 which are stamped out of a plate 14 during fabrication. A top angle 32, 38 and bottom angle 34, 36 are adjacent each end of the slot and are sized to receive and support the ends of the capsule and retain it in the slot, despite possible variances in the capsule length.

An alternate preferred embodiment of the invention is illustrated in FIG. 15. A fishing lure 40 includes an elongated plate 42 having a concaved top surface 44 and a convex bottom surface 46. At least the concave surface is preferably reflective. Rounded fittings 48, 50 extend outwardly from the top surface as shown in FIG. 15. These fittings can be stamped out of the plate during fabrication, in which case an aperture 52 will be formed beneath each fitting as illustrated in FIG. 15. A chemiluminescent capsule 53 is housed within the fittings during use. The lure includes apertures 54, 56 at each end of the plate to enable a fishing line 58 or leader assembly 60 to be attached to the plate. The plate includes a slot 62 in the center portion to allow light from the chemiluminescent capsule to pass through the plate. The slot is preferably wider than the chemiluminescent capsule to enable maximum illumination on the back side of the plate. In operation, light from the capsule can pass through the slot to the back side of the plate, project directly outward from the front of the plate, and be reflected by the concave surface toward the front side of the plate.

FIG. 10 illustrates another embodiment of a fishing lure 64 similar to that illustrated in FIGS. 1–4. An elongated plate 66 is designed to hold a resilient chemiluminescent capsule 68 within an elongated slot 70 in the plate. Cylindrical fittings 72, 74 are riveted to the plate at each end of the slot to receive the ends of the capsule. The fittings are sized to be substantially the same diameter as the capsule and include slot 76 running longitudinally through the fitting to enable it to expand slightly as necessary to receive a capsule.

FIGS. 5–7 illustrate alternate preferred embodiments of the invention which include cylindrical housings for receiving and storing chemiluminescent capsules. FIGS. 5 and 6 illustrate a fishing lure 80 having a hollow elongated cylindrical housing 82. In a preferred embodiment illustrated herein, end caps 84, 86 close the respective ends of the cylindrical housing, although integral ends could also be used. The housing includes a plurality of slots 88 running lengthwise along the cylindrical housing and extending from the exterior of the housing to the hollow interior portion thereof. The width of the slots is substantially equal to the diameter of the capsule so that the resilient capsule can be pushed into the interior of the cylindrical housing through the slots, and yet not accidentally fall out of the slot during use.

Because the outer tube of the capsule is formed of resilient material, a capsule of a given diameter can be inserted through a slot having a width which is equal to, slightly greater than, or even slightly less than the diameter of the capsule. The slot width should be sized to be "substantial equal" to the diameter such that the resilient capsule can be inserted through the slot, yet will not fall freely out of the slot during use.

Capsules are removed from the lure by inserting an object through one slot to engage the capsule and force it through another slot. The housing thus preferably includes at least two slots, each being sized to allow insertion and removal of a capsule through either slot.

FIG. 7 illustrates a modified version of the embodiments of FIGS. 5 and 6. The lure 89 has an external configuration similar to that of FIGS. 5 and 6. The cylindrical housing includes thicker walls than the housing 88 of FIGS. 5 and 6. A pair of slots 92, 94 extend through the walls to allow insertion and removal of the capsules therethrough. The housing includes an annular groove 96 in the exterior portion thereof extending along the length of the housing. An annular spring 98 is mounted within the groove. The spring acts to deter a capsule (not shown) housed in the interior of the housing from accidentally falling out of the lure.

FIG. 9 illustrates a preferred embodiment of the invention. A lure 100 includes a translucent, elongated body 102 fabricated generally in the shape of a small fish. Hooks 104, 106 depend from the body. A cylindrical capsule bore 108 extends longitudinally from the rear end of the body to a location in the interior of the body. The diameter of the capsule bore is sized to be substantially equal to the diameter of the chemiluminescent capsule 110 so that the chemiluminescent capsule can be slid into the bore and it will be held in place by the frictional engagement between the capsule and the interior wall surface of the bore. Extending forwardly from the capsule bore is a relatively small bore 112 which extends from the forward end of the capsule bore to the forward end of the lure body. This relatively small bore is used during removal of a capsule from the capsule bore. A small object such as a pin or wire is inserted into the relatively small bore to contact the forward end of the capsule and force it rearwardly to remove the capsule from the capsule bore.

FIG. 18 illustrates a fishing lure 114 according to the present invention. An elongated body 116 includes a cylindrical bore 118 extending longitudinally through the body from a first opening 120 at the rear of the body to a second opening at the front of the body. The bore is sized such that its diameter is substantially equal to the diameter of a chemiluminescent capsule to be stored in the bore. A slot 122 extends transversely from the bore to the exterior of the lure body as shown in FIG. 18.

In operation, the lure of FIG. 18 is used by inserting an activated chemiluminescent capsule into the bore. The body of the lure is preferably fabricated of translucent material so that light from the capsule can project from the bore through the body of the lure to attract fish. To remove a chemiluminescent capsule from the bore, a thin object such as a knife blade is aligned with the slot at one end of the bore and pushed through the slot and bore to force the capsule out of the bore. Another capsule may then be inserted into the bore as desired. FIG. 19 illustrates a lure 124 similar to the embodiment of FIG. 18, having a bore 126 and a slot 128 communicating therewith.

The outer surface of the lure 114 of FIG. 18 includes a plurality of convex protrusions 130 on its outer surface to diffuse the light from the chemiluminescent capsule. Other surface irregularities, such as the concave indentations 132 illustrated in FIG. 19, the scale-like projections 134 illustrated in FIG. 20, or the strake-like projections 136 of FIG. 21 may also be used to accomplish the same purpose. Such surface irregularities will cause light from the chemiluminescent capsule to project from the lure at varying angles and additionally cause acoustical effects similar to the sound of fish traveling through water.

FIGS. 16 and 17 illustrate a fishing lure 137 having an elongated body 138 including an elongated hollow cavity 140 therein for housing a chemiluminescent capsule 142. The cavity is defined by two opposed planar side walls 144, 146 as best illustrated in FIG. 17, which are spaced apart a distance substantially equal to the diameter of the chemiluminescent capsule. A relatively shallow recess 148 extends along the length of one side wall at a location in the interior of the side wall as seen in FIG. 17. In operation, a chemiluminescent capsule can be inserted between the side walls and located within the recess. The extra room provided by the recess allows the resilient capsule to expand and rest in the interior of the cavity. Unless a force is applied to the capsule, it will tend to remain within the recess. When removal is desired, the capsule is merely pushed out of the recess and through the side walls to remove it from the lure.

The body of the lure illustrated in FIG. 16 additionally includes small apertures 150, 152 extending from each end of the cavity to the corresponding exterior end of the body to allow a fishing line 154 or lure accessory 156 to be attached to the lure as desired.

An apparatus according to the present invention for attaching a chemiluminescent capsule to a segment of fishing line is illustrated in FIGS. 11 and 12. A capsule holder 158 comprises an elongated wire member 160 having loops 162, 164 for supporting a chemiluminescent capsule (illustrated in phantom line). The interior dimensions of the loop are sized substantially equal to the exterior dimensions of the capsule such that a capsule can be snuggly held within the loops by inserting it therethrough. The member 160 may be manufactured from an appropriate metal or plastic.

At each end of the wire member are resilient line fasteners 168, 170. As best illustrated in FIG. 12, line fasteners comprise a bent segment of wire forming two pair of adjacent wire segments 172, 174 between which a fishing line 176 or the like may be threaded as illustrated in FIG. 12. This arrangement allows a chemiluminescent capsule to be readily attached and detached from a fishing line. Once a capsule is inserted in the loops, the capsule holder is attached to the line by threading the line fasteners in the manner illustrated in FIG. 12. The capsule holder will remain in place during use and can be quickly removed from a fishing line when desired.

FIG. 8 illustrates a similar arrangement according to the present invention where a fish hook 178 includes two spaced apart loops 180, 182 integrally formed therein for receiving and retaining a chemiluminescent capsule 184. The interior of the loops are sized substantially equal to the exterior of the capsule.

FIGS. 13 and 14 illustrate a preferred embodiment of the present invention comprising a fish lure 186 having a preferably translucent body 188. An air cavity 190 is provided in the rear of the body for bouyancy. If desired, a weight may be inserted within the cavity. A bore 192 extends diagonally across the body when viewed in plan, for receiving a chemiluminescent capsule. The bore extends from one side of the lure body to the other and is sized such that its diameter is substantially equal to the diameter of the chemiluminescent capsule to be housed in the bore. In operation, a capsule is inserted into the bore for use. When it is desired to remove the capsule, an object is inserted into one end of the bore to force the capsule out the other end of the bore.

Although the invention has been described and disclosed herein with respect to particular embodiments thereof, it is not intended that the invention be limited to these embodiments, but include all embodiments which are within the spirit of the invention.

I claim:

1. An apparatus for attracting fish using an elongated chemiluminescent capsule having a resilient exterior surface, which comprises:
    an elongated plate having reflective surfaces on opposite faces of the plate, the plate being relatively thin with respect to the capsule and including an aperture adjacent each end of the plate for attachment of a fishing line, hook, or the like to the plate, the plate having an elongated slot extending transversely through the plate intermediate the apertures for receiving a chemiluminescent capsule; and
    means integral with the plate for removably securing the chemiluminescent capsule in the slot such that the capsule will extend transversely beyond the faces of the plate, thereby enabling light from the capsule to project onto reflective surfaces of the plate and reflect outwardly therefrom.

2. The apparatus of claim 1 wherein the width of the slot is substantially equal to the diameter of the chemiluminescent capsule.

3. An apparatus for attracting fish using an elongated chemiluminescent capsule having a resilient exterior surface which comprises:
    an elongated plate having a concave face on the front face thereof, the plate including a reflective surface on the concave front face, and an aperture adjacent each end of the plate for attachment of a fishing line, hook, or the like to the plate, the plate further including an elongated slot intermediate the apertures to enable light from the capsule to pass through the plate; and
    means integral with the plate for removably securing the chemiluminescent capsule adjacent the concave front face of the plate and adjacent the slot such that light projecting from the capsule can pass through the slot as well as reflect off the reflective surfaces on the concave front face of the plate.

4. An illuminated fishing lure for housing an elongated chemiluminescent capsule having a resilient outer layer, comprising:
    an elongated body including a cavity formed in the body by a pair of opposed planar side walls spaced apart a distance substantially equal to the diameter of the chemiluminescent capsule such that a chemiluminescent capsule can be inserted snuggly into the cavity by deforming its resilient outer layer, the lure additionally including an elongated recess extending along the interior of one of the side walls to provide an expansion location within the cavity where the capsule can be positioned during use.

5. A fishing lure for holding an elongated chemiluminescent capsule having a generally cylindrical cross section and a resilient outer layer, which comprises:
    an elongated member, including two spaced apart loops, the loops aligned with one another and extending transversely outward from the member, the diameter of the loops sized to be substantially equal to the diameter of the capsule so that the capsule can be inserted therethrough and retained in the loops during use; and
    a line fastener located at each end of the member, the line fasteners comprising a looping segment forming two pairs of adjacent segments between which a fishing line may be quickly threaded and unthreaded to attach the chemiluminescent capsule to the fishing line.

6. The lure of claim 5 wherein said member is comprised of resilient wire.

7. An apparatus for attracting fish using an elongated chemiluminescent capsule having a resilient exterior surface, which comprises:
    an elongated plate having reflective surfaces on opposite faces of the plate, the plate being relatively thin with respect to the capsule and including an aperture adjacent each end of the plate for attachment of a fishing line, hook, or the like to the plate, the plate having an elongated slot extending transversely through the plate intermediate the apertures for receiving a chemiluminescent capsule; and
    means fixedly attached to the plate for removably securing the chemiluminescent capsule in the slot such that the capsule will extend transversely beyond the faces of the plate, thereby enabling light from the capsule to project onto reflective surfaces of the plate and reflect outwardly therefrom.

8. The apparatus of claim 7 wherein the means securing the chemiluminescent capsule is a pair of retainers spaced apart and sized to receive and hold the ends of the chemiluminescent capsule therein.

* * * * *